(12) United States Patent
Feng et al.

(10) Patent No.: US 8,284,647 B2
(45) Date of Patent: Oct. 9, 2012

(54) METHOD AND DEVICE FOR DETECTING THICKNESS OF OPTICAL DISC

(75) Inventors: Wen-Chun Feng, Hsinchu (TW); Zhi-Hsin Lin, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 132 days.

(21) Appl. No.: 12/884,426

(22) Filed: Sep. 17, 2010

(65) Prior Publication Data

US 2011/0310716 A1 Dec. 22, 2011

(30) Foreign Application Priority Data

Jun. 17, 2010 (TW) ................................ 99119764 A

(51) Int. Cl.
*G11B 20/18* (2006.01)
(52) U.S. Cl. ..................................... 369/53.2; 369/53.41
(58) Field of Classification Search ................ 369/53.41, 369/53.2
See application file for complete search history.

(56) References Cited

U.S. PATENT DOCUMENTS

| | | | |
|---|---|---|---|
| 2002/0181370 A1* | 12/2002 | Yamanoi et al. ............ | 369/53.22 |
| 2003/0161231 A1* | 8/2003 | Ueki .......................... | 369/44.29 |
| 2005/0052977 A1* | 3/2005 | Sun ............................ | 369/53.23 |
| 2005/0068860 A1* | 3/2005 | Kanou ........................ | 369/44.27 |
| 2005/0105433 A1* | 5/2005 | Juan et al. .................. | 369/53.23 |
| 2006/0120229 A1* | 6/2006 | Nabeta ....................... | 369/44.27 |
| 2006/0158987 A1* | 7/2006 | Jodorkovsky et al. ........ | 369/53.2 |
| 2010/0157763 A1* | 6/2010 | Verbeek et al. ............ | 369/53.22 |
| 2011/0170398 A1* | 7/2011 | Komma et al. ........... | 369/112.23 |

\* cited by examiner

*Primary Examiner* — Joseph Feild
*Assistant Examiner* — Brenda Bernardi
(74) *Attorney, Agent, or Firm* — WPAT, PC; Justin King

(57) ABSTRACT

A method for detecting a thickness of an optical disc is provided. Firstly, a beam intensity signal and a focusing error signal are generated. Then, a first time interval for a focus point of the laser beam to move from a first layer to a second layer of the optical disc is acquired according to the beam intensity signal or the focusing error signal. Then, a second time interval between two peak values of an S curve of the focusing error signal is detected. Afterwards, the thickness between the first layer and the second layer is calculated according to a known S-curve detection range, the first time interval and the second time interval. The S-curve detection range is multiplied by said first time interval and divided by said second time interval to obtain the thickness between the first layer and the second layer of the optical disc.

10 Claims, 8 Drawing Sheets

METHOD AND DEVICE FOR DETECTING THICKNESS OF OPTICAL DISC

CROSS-REFERENCE TO RELATED APPLICATION

This application claims the priority benefit of Taiwan application serial no. 099119764, filed on Jun. 17, 2010. The entirety of the above-mentioned patent application is incorporated herein by reference and made a part of this specification.

BACKGROUND

1. Technical Field

The present invention relates to a method and a device for detecting a thickness of an optical disc, and more particularly to a method and a device for detecting a thickness between respective layers of an optical disc in an optical disc drive.

2. Description of the Related Art

During a process of recording or reproducing an optical disc by an optical disc drive, the thickness of the transparent plastic layer of the optical disc is an important factor influencing occurrence of a spherical aberration effect. In addition, the thickness of the transparent plastic layer of the optical disc is employed to judge the type of the optical disc (e.g. CD, DVD or BD). Generally, the thickness of the transparent plastic layer of the optical disc is equal to the distance between a surface layer and a data layer of the optical disc.

FIG. 1 is a schematic functional block diagram illustrating a device for detecting the thickness of a transparent plastic layer of an optical disc in a conventional optical disc drive. As shown in FIG. 1, the thickness detecting device 100 comprises a processing unit 110, a motor driver 120, a focusing actuator 125, an objective lens 130, a photo sensor 140 and a pre-amplifier 150. The processing unit 110 is a digital signal processor (DSP) for outputting a focus control output signal FCO to the motor driver 120. According to the focus control output signal FCO, the motor driver 120 issues a focus motor output signal FMO to the focusing actuator 125. According to the focus motor output signal FMO, the focusing actuator 125 generates a driving force F to move the objective lens 130. During the objective lens 130 is moved, the light beams B reflected by the optical disc are sent to the photo sensor 140. As such, the change of the light intensity is detected by the photo sensor 140. When the focus point of the light beams is moving, plural photo signals PS are generated and transmitted to the pre-amplifier 150. By the pre-amplifier 150, the photo signals are synthesized into a beam intensity signal BS and a focusing error signal FE, which are transmitted to the processing unit 110.

Conventionally, for detecting the thickness of the transparent plastic layer of the optical disc, the focus control output signal FCO issued by the processing unit 110 is gradually increased. The focus control output signal FCO is amplified into the focus motor output signal FMO by the motor driver 120. According to the focus motor output signal FMO, the focusing actuator 125 controls movement of the objective lens 130 toward the optical disc.

FIG. 2 is a schematic diagram illustrating associated signals processed in the thickness detecting device of FIG. 1. As the objective lens 130 is ascended, focus point of the laser beam successively cross the surface layer of the optical disc. In this situation, the beam intensity signal BS has a first peak value with lower amplitude (also referred as a surface layer signal). As the objective lens 130 is continuously ascended and the focus point reaches the data layer, the beam intensity signal BS has a second peak value with higher amplitude (also referred as a data layer signal). By measuring the time interval T between these two peak values, the thickness between the surface layer and the data layer of the optical disc is deduced.

Alternatively, as the objective lens 130 is ascended, focus point of the laser beam successively cross the surface layer of the optical disc. In this situation, a first S curve of the focusing error signal FE having a lower peak-to-peak value is obtained. As the objective lens 130 is continuously ascended and the focus point reaches the data layer, a second S curve of the focusing error signal FE having a higher peak-to-peak value is obtained. By measuring a time interval between the zero crossing points of the first S curve and the second S curve, the thickness of the transparent plastic layer of the optical disc is deduced.

In other word, once the focus control output signal (FCO) outputted from the processing unit 110 is multiplied by the gain value of the motor driver 120, the speed (v) of moving the objective lens 130 is obtained. The thickness of the transparent plastic layer of the optical disc is easily obtained according to the formula: $\Delta d = v \times T$.

However, due to the mass production of the optical disc drives, the gain values of the motor driver 120 and the focusing actuator 125 are usually suffered from variations. That is, even if the settings of the motor drivers 120 of different optical disc drives are identical, the focus motor output signals outputted from the motor drivers 120 are different. As such, the thickness $\Delta d$ of the transparent plastic layer of the optical disc by the conventional method usually results in large error. Under this circumstance, erroneous judgment of the thickness occurs.

That is, if the gain value of the motor driver 120 or the focusing actuator 125 is inconsistent because the producing quality of the thickness detecting device 100 is deteriorated, the thickness of the transparent plastic layer of the optical disc is not believable.

FIG. 3 is a schematic diagram illustrating associated signals processed in the thickness detecting device, in which the gain value of the motor driver 120 is varied. Assuming that two optical disc drives issue identical focus control output signal FCO and the settings of the gain values are identical, the objective lenses of the two optical disc drives are both moved in the speed v. Since the gain values of the motor driver 120 and the focusing actuator 125 are varied, the focus motor output signals are distinguished. As shown in FIG. 3, when an optical disc is loaded in a first optical disc drive having a lower gain value than a second optical disc drive, the slop of the first focus control output signal FCO1 from the first optical disc drive is lower than the slop of the second focus control output signal FCO2 from the second optical disc drive. As such, a first beam intensity signal BS1 indicated as the solid line is obtained by the first optical disc drive, and a second beam intensity signal BS2 indicated as the dotted line is obtained by the second optical disc drive. The time interval T1 between the two peak values of the first beam intensity signal BS1 is longer than the time interval T2 between the two peak values of the second beam intensity signal BS2 (i.e. T1>T2). The thickness of the transparent plastic layer of the optical disc is obtained by the first optical disc drive according to the formula: $\Delta d1 = v \times T1$. The thickness of the transparent plastic layer of the optical disc is obtained by the second optical disc drive according to the formula: $\Delta d2 = v \times T2$. The thickness difference between these two optical disc drives is about 20% or even 50%.

Similar, the method for detecting the thickness of the transparent plastic layer of the optical disc according to the focusing error signal FE may result in thickness difference when two optical disc drives are used. In other words, the conventional thickness detecting method is not suitable to detect the thickness of the transparent plastic layer of the optical disc if the gain values of different optical disc drives are different.

BRIEF SUMMARY

The present invention provides a method and a device for detecting the thickness between respective layers of an optical disc in an optical disc drive. The thickness between two layers of the optical disc is accurately detected according to the known S-curve detection range Ds. As a consequence, the influence of the variation of the gain value of the motor driver or the focusing actuator may be neglected.

In accordance with an aspect, the present invention provides a method for detecting a thickness of an optical disc. Firstly, a beam intensity signal and a focusing error signal are generated by illuminating laser beam and moving an objective lens. Then, a first time interval for a focus point of the laser beam to move from a first layer to a second layer of the optical disc is acquired according to the beam intensity signal or the focusing error signal. Then, a second time interval between two peak values of an S curve of the focusing error signal is detected. Afterwards, the thickness between the first layer and the second layer is calculated according to a known S-curve detection range, the first time interval and the second time interval. The S-curve detection range is multiplied by said first time interval and divided by said second time interval to obtain the thickness between the first layer and the second layer of the optical disc.

In accordance with another aspect, the present invention provides a device for detecting a thickness of an optical disc. The device includes a processing unit, a motor driver, a focusing actuator, an objective lens, a photo sensor and a pre-amplifier. The processing unit issues a focus control output signal. The motor driver is electrically connected to the processing unit for issuing a focus motor output signal according to the focus control output signal. The focusing actuator is electrically connected to the motor driver for generating a driving force according to the focus motor output signal. The objective lens is electrically connected to the focusing actuator and moved in response to the driving force. The photo sensor is used for receiving laser beam reflected from an optical disc in response to movement of the objective lens, thereby generating plural photo signals. The pre-amplifier is electrically connected to the photo sensor for receiving the photo signals, synthesizing the photo signals into a beam intensity signal and a focusing error signal, and transmitting the beam intensity signal and the focusing error signal to the processing unit. A first time interval for a focus point of the laser beam to move from a first layer to a second layer of the optical disc is acquired by the processing unit according to the beam intensity signal or the focusing error signal. A second time interval between two peak values of an S curve of the focusing error signal is detected by the processing unit. The thickness between the first layer and the second layer is calculated according to a known S-curve detection range, the first time interval and the second time interval.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
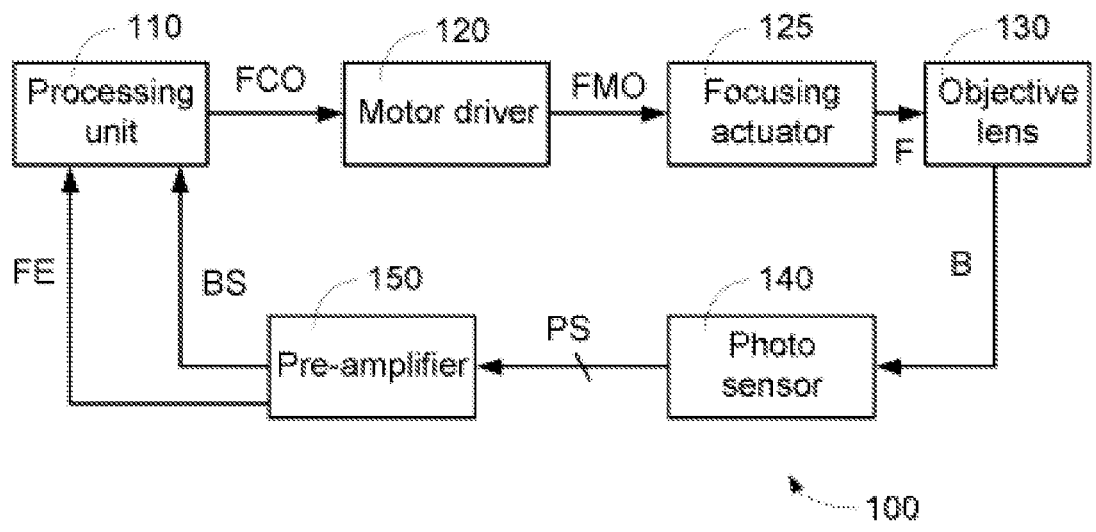
FIG. 1 is a schematic functional block diagram illustrating a device for detecting the thickness of a transparent plastic layer of an optical disc in a conventional optical disc drive.
Figure 2:
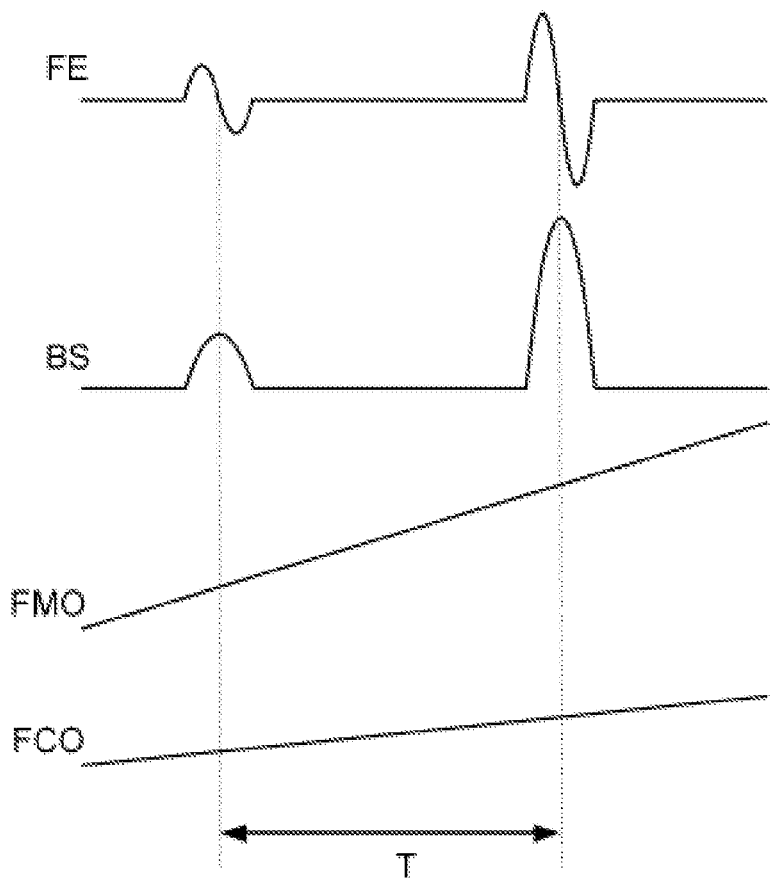
FIG. 2 is a schematic diagram illustrating associated signals processed in the thickness detecting device of FIG. 1.
Figure 3:
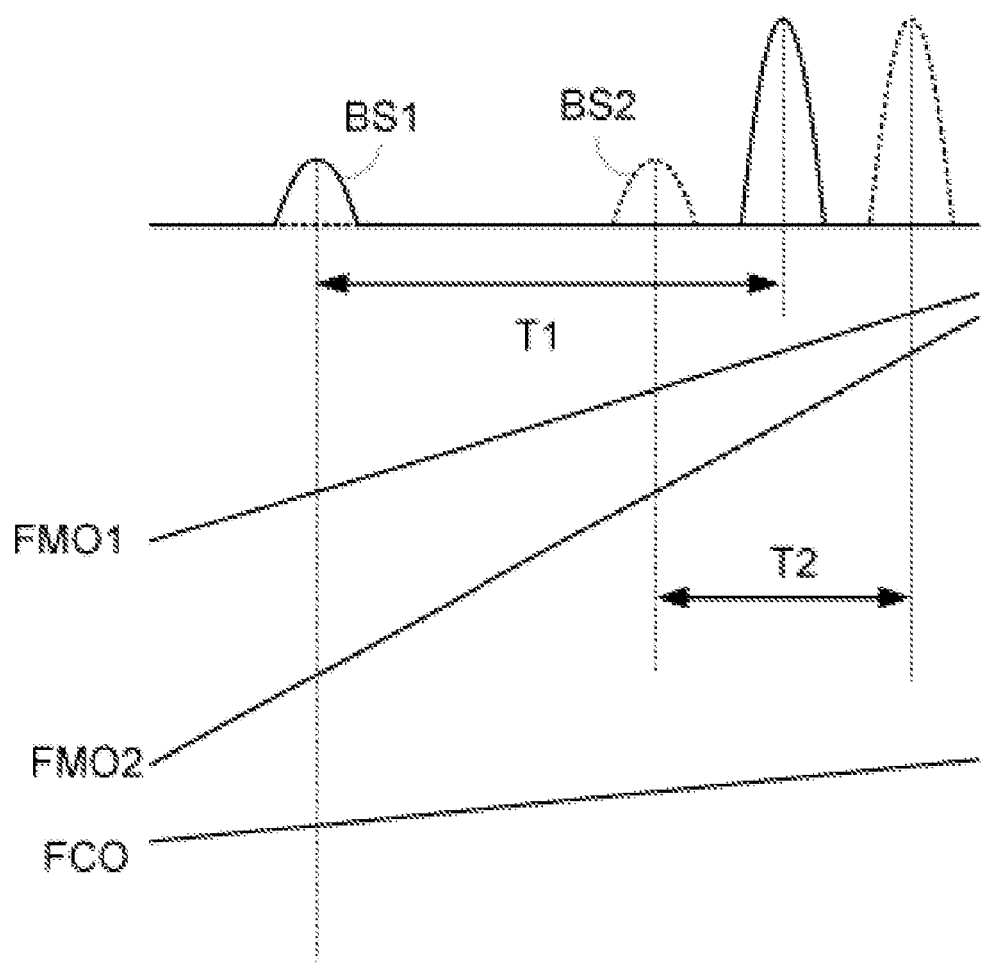
FIG. 3 is a schematic diagram illustrating associated signals processed in the thickness detecting device, in which the gain value of the motor driver is varied.
Figure 4:
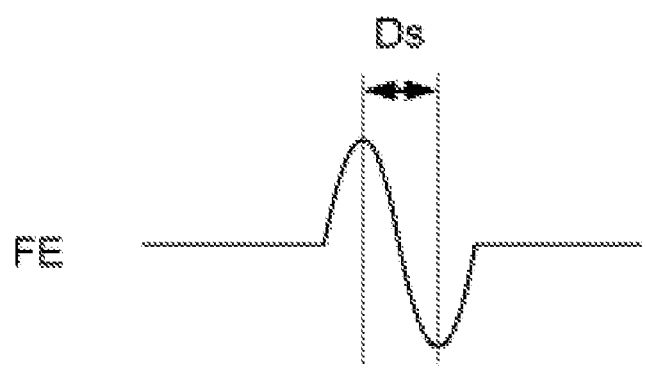
FIG. 4 is a schematic diagram illustrating an S-curve detection range Ds used as an index for detecting the thickness of a transparent plastic layer of an optical disc according to the present invention.

As known, after the optical pickup head of an optical disc drive is introduced to the market, the specification of the optical disc drive provided by the manufacturer may define an S-curve detection range Ds (or S-curve p-p value). FIG. 4 is a schematic diagram illustrating an S-curve detection range Ds used as an index for detecting the thickness of a transparent plastic layer of an optical disc according to the present invention. After the optical pickup head of an optical disc drive is produced, an S curve of the focusing error signal FE is obtained by moving the lens. The S-curve detection range Ds is defined as a moving distance between the highest peak value and the lowest peak value of any S curve of the focusing error signal FE (for example 14 μm). Since the S-curve detection range Ds is substantially identical for different focusing error signals, the S-curve detection range Ds is a good index for detecting the thickness of a transparent plastic layer of an optical disc. In this situation, even if the gain value of the motor driver or the focusing actuator has a variation for different optical disc drives, the thickness detecting method and the thickness detecting device of the present invention can accurately detect thickness of a transparent plastic layer of an optical disc.

Figure 5:
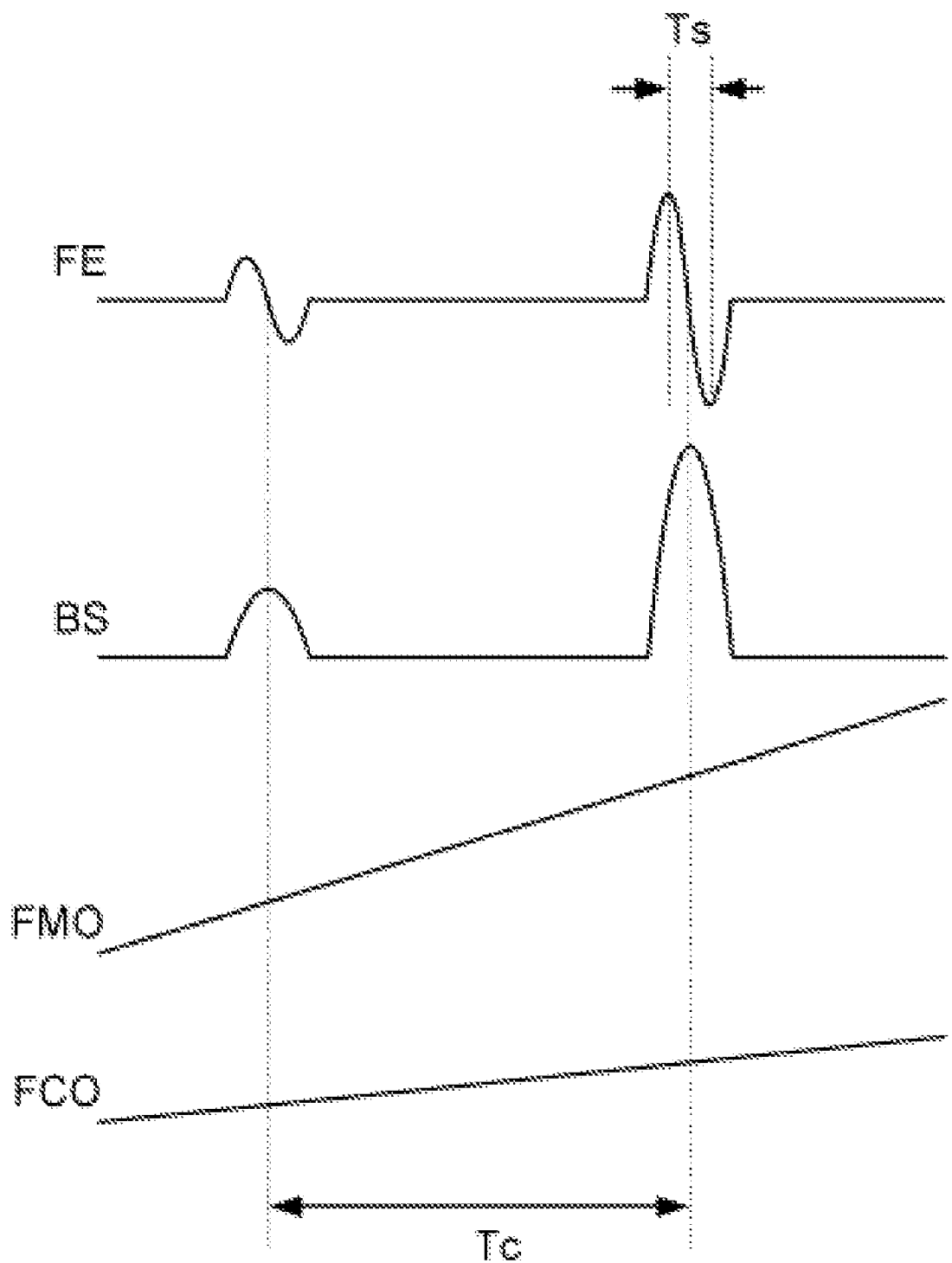
FIG. 5 is a schematic diagram illustrating associated signals processed in the thickness detecting device by referring to the S curve of the focusing error signal FE according to the present invention.

FIG. 5 is a schematic diagram illustrating associated signals processed in the thickness detecting device by referring to the S curve of the focusing error signal FE according to the present invention. As the objective lens 230 (see FIG. 6) is ascended, the focus point of the laser beam successively crosses the surface layer of the optical disc. In this situation, the beam intensity signal BS has a first peak value with lower amplitude (also referred as a surface layer signal). As the objective lens 230 is continuously ascended and the focus point reaches the data layer, the beam intensity signal BS has a second peak value with higher amplitude (also referred as a data layer signal). Then, the time interval Tc between these two peak values is measured. Alternatively, as the objective lens 230 is ascended, focus point of the laser beam successively crosses the surface layer of the optical disc. In this situation, a first S curve of the focusing error signal FE having a lower peak-to-peak value is obtained. As the objective lens 230 is continuously ascended and the focus point reaches the data layer, a second S curve of the focusing error signal FE having a higher peak-to-peak value is obtained. Then, the time interval Tc between the zero crossing points of the first S curve and the second S curve is also measured.

In accordance with the present invention, the time interval Ts between the highest peak value and the lowest peak value of any S curve of the focusing error signal FE should be measured. Regardless of the moving speed of the lens, the ratio of the thickness $\Delta d$ of the transparent plastic layer of the optical disc to the S-curve detection range Ds of the S curve is equal to the ratio of Tc to Ts. That is, $\Delta d/Ds = Tc/Ts$. After the S-curve detection range Ds, Tc and Ts are obtained, the thickness $\Delta d$ of the transparent plastic layer of the optical disc may be calculated according to the formula: $\Delta d = (Tc/Ts) \times Ds$.

Figure 6:
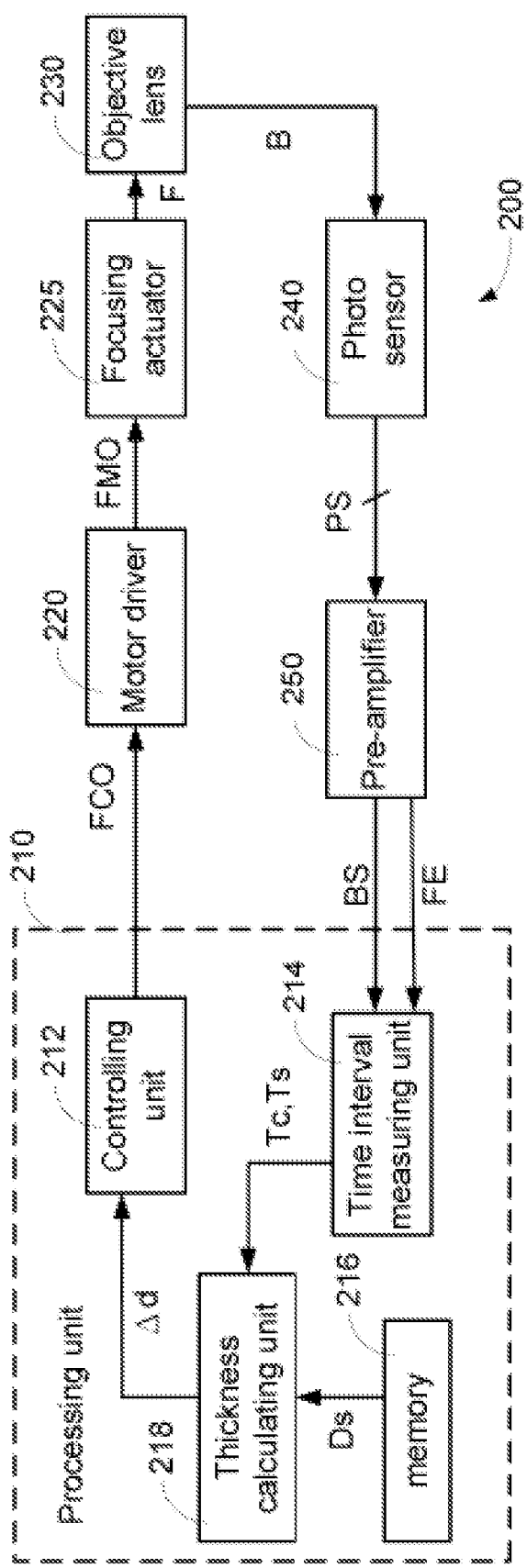
FIG. 6 is a schematic functional block diagram illustrating a device for detecting the thickness of a transparent plastic layer of an optical disc in an optical disc drive according to the present invention.

FIG. 6 is a schematic functional block diagram illustrating a device for detecting the thickness of a transparent plastic layer of an optical disc in an optical disc drive according to the present invention. As shown in FIG. 6, the thickness detecting device 200 comprises a processing unit 210, a motor driver 220, a focusing actuator 225, an objective lens 230, a photo sensor 240 and a pre-amplifier 250. An example of the processing unit 210 is a digital signal processor (DSP). The processing unit 210 comprises a controlling unit 212, a time interval measuring unit 214, a memory 216 and a thickness calculating unit 218.

Moreover, the controlling unit 212 of the processing unit 210 may issues a focus control output signal FCO to the motor driver 220. According to the focus control output signal, the motor driver 220 issues a focus motor output signal FMO to the focusing actuator 225. According to the focus motor output signal, the focusing actuator 225 generates a driving force F to move the objective lens 130. During the objective lens 230 is moved, the light beams B reflected by the optical disc are sent to the photo sensor 240. As such, the change of the light intensity is detected by the photo sensor 240. When the focus point of the light beams is moving to the surface layer or the data layer, plural photo signals PS are generated and transmitted to the pre-amplifier 150. By the pre-amplifier 250, the photo signals are synthesized into a beam intensity signal BS and a focusing error signal FE, which are transmitted to the processing unit 210.

Since the S-curve detection range Ds is defined in the specification of the optical disc drive provided by the manufacturer after the optical pickup head of an optical disc drive is introduced to the market, the S-curve detection range Ds may be previously recorded in the memory 216 by the researcher.

The beam intensity signal BS and the focusing error signal FE are received by the time interval measuring unit 214. According to the beam intensity signal BS or the focusing error signal FE, the time interval Tc for the focus point of the laser beam to move from the surface layer to the data layer of the optical disc is acquired by the time interval measuring unit 214. In addition, the time interval Ts between the two peak values of the S curve of the focusing error signal FE is also detected by the time interval measuring unit 214.

The S-curve detection range Ds retrieved by the memory 216 and the time intervals Tc and Ts detected by the time interval measuring unit 214 are transmitted to the thickness calculating unit 218. After the values Ds, Tc and Ts are obtained, the thickness $\Delta d$ of the transparent plastic layer of the optical disc is calculated according to the formula: $\Delta d = (Tc/Ts) \times Ds$. The data associated with the thickness $\Delta d$ of the transparent plastic layer will be transmitted to the controlling unit 212. According to the thickness $\Delta d$ of the transparent plastic layer, a further processing operation is done. The further processing operation includes for example correcting the spherical aberration effect or judging the type of the optical disc.

Figure 7:
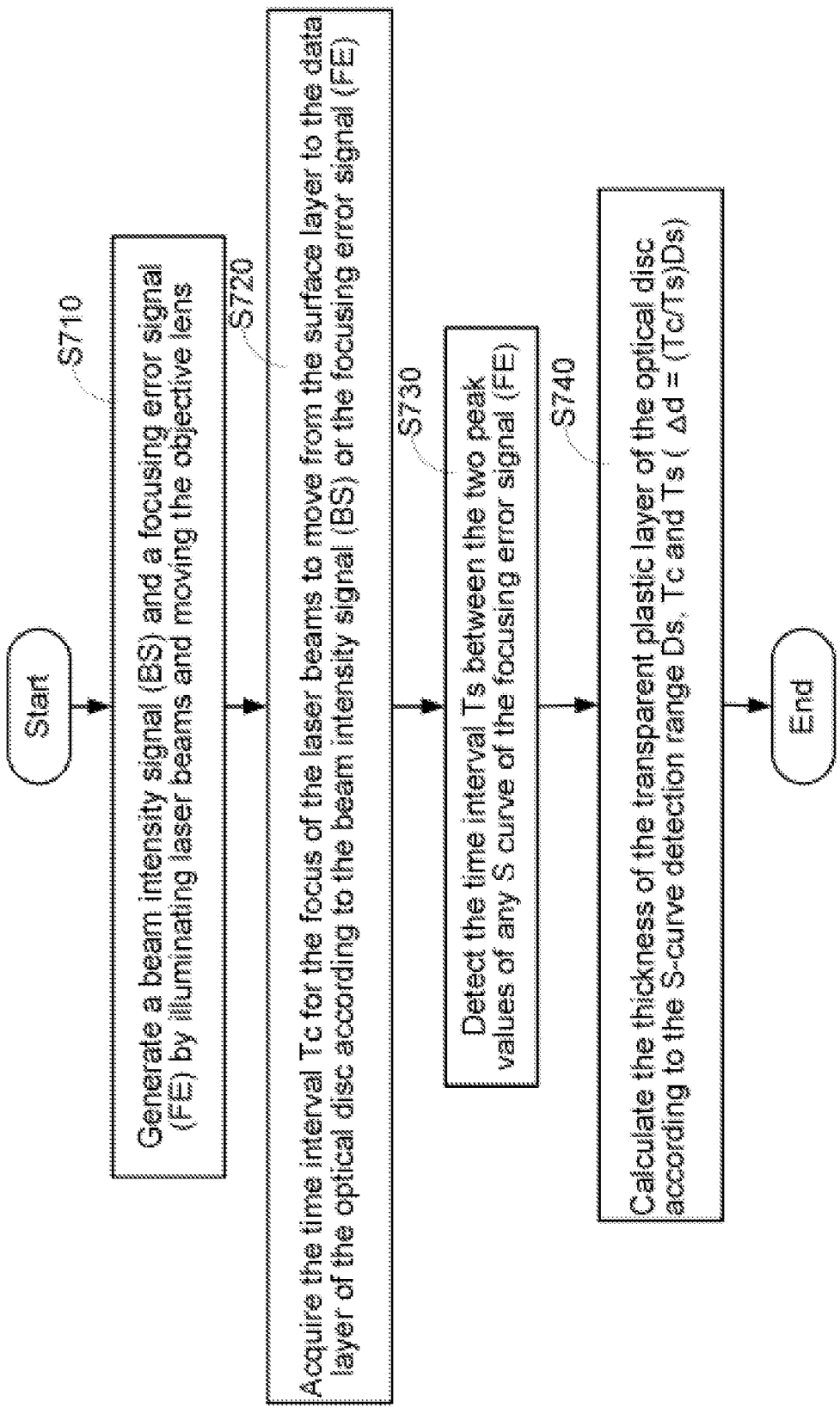
FIG. 7 is a flowchart illustrating a method for detecting the thickness of a transparent plastic layer of an optical disc according to the present invention.

FIG. 7 is a flowchart illustrating a method for detecting the thickness of a transparent plastic layer of an optical disc according to the present invention. First of all, in the step S710, a beam intensity signal BS and a focusing error signal FE are generated by illuminating laser beam and moving the objective lens. Then, in the step S720, the time interval Tc for the focus point of the laser beam to move from the surface layer to the data layer of the optical disc is acquired according to the beam intensity signal BS or the focusing error signal FE. Then, in the step S730, the time interval Ts between the two peak values of any S curve of the focusing error signal FE is detected. After the values Ds, Tc and Ts are obtained, the thickness $\Delta d$ of the transparent plastic layer of the optical disc is calculated according to the formula: $\Delta d = (Tc/Ts) \times Ds$ (step S740).

From the above description, it is found that the thickness of the transparent plastic layer of the optical disc can be accurately measured according to the known S-curve detection range Ds. In this situation, even if the gain value of the motor driver or the focusing actuator has a variation for different optical disc drives, the thickness detecting method and the thickness detecting device of the present invention can accurately detect thickness of the transparent plastic layer of the optical disc.

The thickness detecting device of the present invention can also be used to detect the thickness between two recording layers of a dual-layer optical disc.

Figure 8:
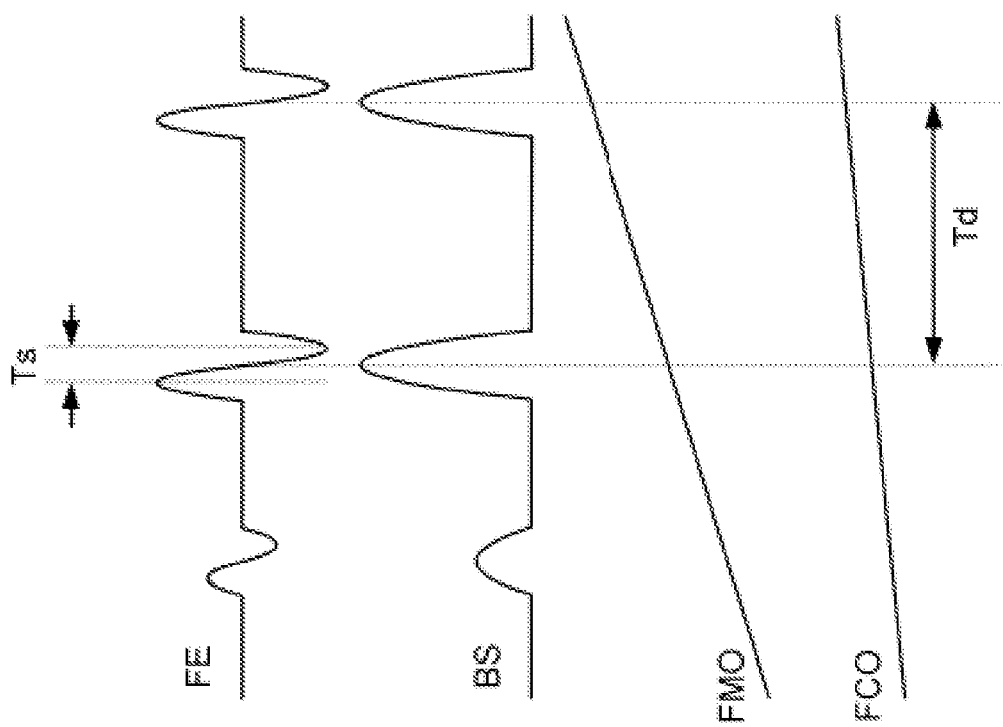
FIG. 8 is a schematic diagram illustrating associated signals processed in a device for detecting the thickness between two recording layers according to the present invention.

FIG. 8 is a schematic diagram illustrating associated signals processed in a device for detecting the thickness between two recording layers according to the present invention. As the objective lens 230 is ascended, the focus point of the laser beam successively crosses the surface layer of the optical disc. In this situation, the beam intensity signal (BS) has a first peak value (also referred as a surface layer signal). As the objective lens 230 is continuously ascended and the focus reaches the first recording layer, the beam intensity signal (BS) has a second peak value (also referred as a first recording layer signal). As the objective lens 230 is continuously ascended and the focus reaches the second recording layer, the beam intensity signal (BS) has a third peak value (also referred as a second recording layer signal). Then, the time interval Td between the second peak value and the third peak value is measured.

Alternatively, as the objective lens 230 is ascended, the focus point of the laser beam successively crosses the surface layer of the optical disc. In this situation, a first S curve of the focusing error signal FE is obtained. As the objective lens 230 is continuously ascended and the focus reaches the first recording layer, a second S curve of the focusing error signal FE is obtained. As the objective lens 230 is continuously ascended and the focus reaches the second recording layer, a third S curve of the focusing error signal FE is obtained. By measuring the zero crossing points of the second S curve and the third S curve, the time interval Td is also measured.

In accordance with the present invention, the time interval Ts between the highest peak value and the lowest peak value of any S curve of the focusing error signal FE should be measured. Regardless of the moving speed of the lens or the variation of the gain value of the motor driver or the focusing actuator, the ratio of the thickness d between two recording layers of the optical disc to the S-curve detection range Ds is equal to the ratio of Td to Ts. After the S-curve detection range Ds of the S curve, Td and Ts are obtained, the thickness d between two recording layers of the optical disc may be calculated according to the formula: $d = (Td/Ts) \times Ds$.

Figure 9:
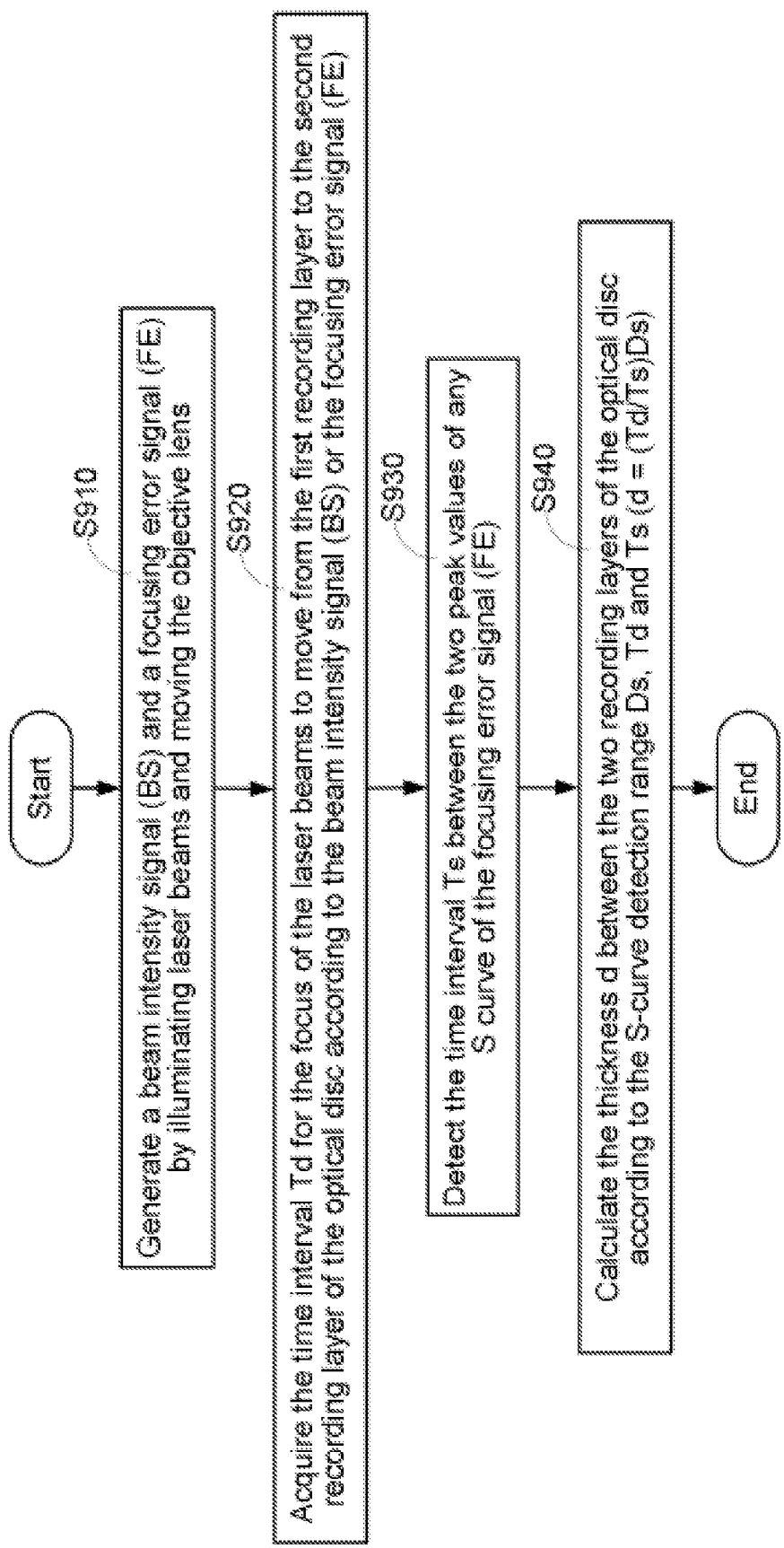
FIG. 9 is a flowchart illustrating a method for detecting the thickness between two recording layers according to the present invention.

FIG. 9 is a flowchart illustrating a method for detecting the thickness between two recording layers according to the present invention. First of all, in the step S910, a beam intensity signal BS and a focusing error signal FE are generated by illuminating laser beam and moving the objective lens. Then, in the step S920, the time interval Td for the focus point of the laser beam to move from the first recording layer to the second recording layer of the optical disc is acquired according to the beam intensity signal BS or the focusing error signal FE. Then, in the step S930, the time interval Ts between the two peak values of any S curve of the focusing error signal FE is detected. After the values Ds, Td and Ts are obtained, the thickness between the two recording layers of the optical disc is calculated according to the formula: $d = (Td/Ts) \times Ds$ (step S940).

Figure 10:
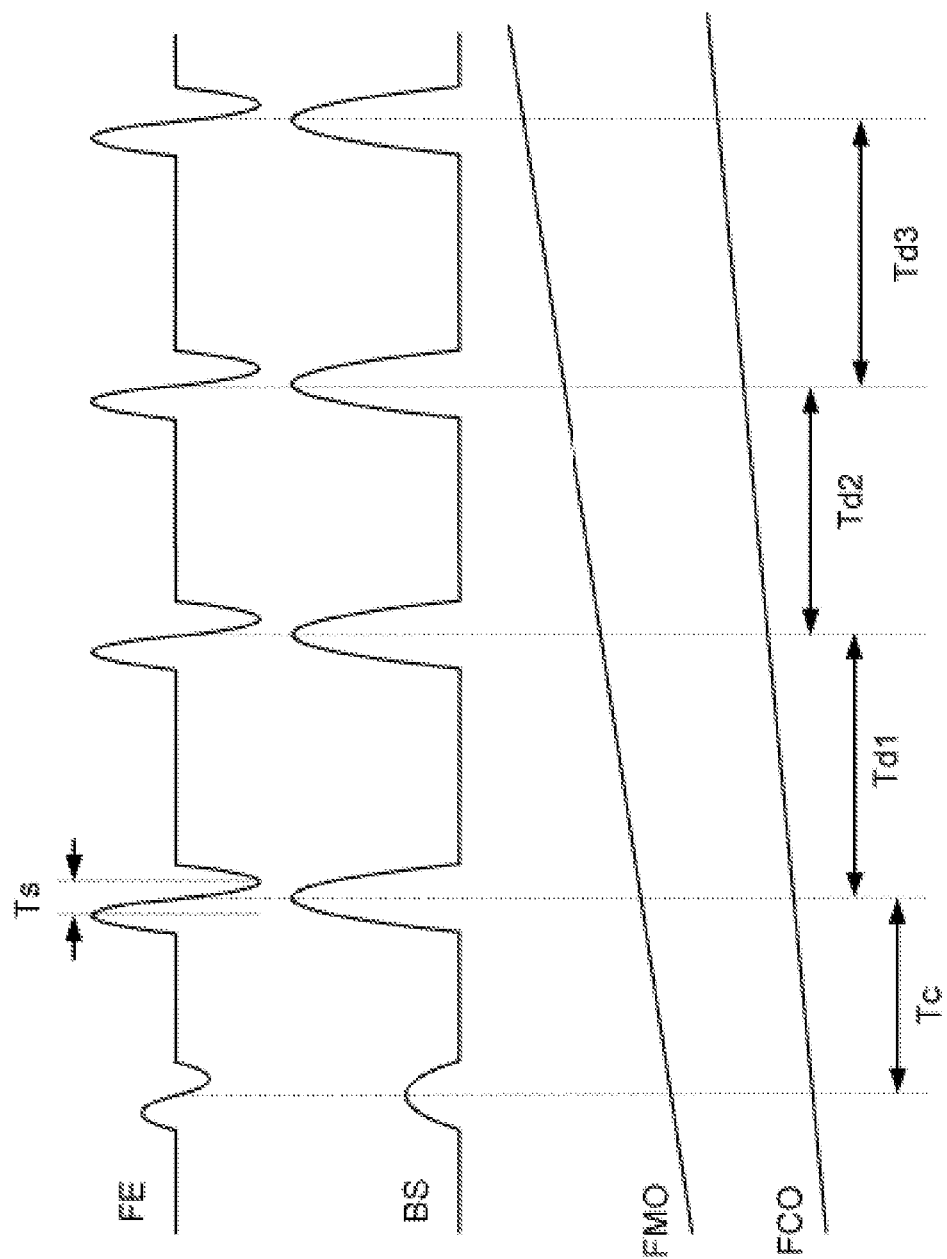
FIG. 10 is a schematic diagram illustrating associated signals processed in a thickness detecting device for use in a multi-layer optical disc according to the present invention.

FIG. 10 is a schematic diagram illustrating associated signals processed in a thickness detecting device for use in a multi-layer optical disc according to the present invention. For example, the multi-layer optical disc is a four-layer optical disc. As the objective lens 230 is ascended, the focus point of the laser beam successively crosses a surface layer, a first recording layer, a second recording layer, a third recording layer and a fourth layer. As such, five peak values of the beam intensity signal BS and five S curves of the focusing error signal FE are obtained. The time interval Tc for the focus point of the laser beam to move from the surface layer to the data layer, the time interval Td1 for the focus point of the laser beam to move from the first recording layer to the second recording layer, the time interval Td2 for the focus point of the laser beam to move from the second recording layer to the third recording layer and the time interval Td3 for the focus point of the laser beam to move from the third recording layer to the fourth recording layer are acquired by the time interval measuring unit 214. The multi-layer optical disc of this embodiment is illustrated by referring to a four-layer optical disc. Nevertheless, the multi-layer optical disc may have more recording layers, and the time interval for the focus point of the laser beam to move between any two recording layers is acquired by the time interval measuring unit 214.

Similarly, the time interval Ts between the two peak values of any S curve of the focusing error signal FE is also acquired by the time interval measuring unit 214. After the values Ds, Td1, Td2, Td3 and Ts are obtained, the distance between any two layers will be calculated by the thickness calculating unit 218. For example, the distance between the first recording layer and the fourth recording layer is calculated according to the formula: $d' = [(Td1+Td2+Td3)/Ts] \times Ds$.

From the above description, the thickness detecting method and the thickness detecting device of the present invention are capable of detecting the thickness of a transparent plastic layer or the thickness between any two layers of the optical disc. Regardless of the variation of the gain value of the motor driver or the focusing actuator, the thickness of a transparent plastic layer or the thickness between any two layers of the optical disc can be accurately detected.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for detecting a thickness of an optical disc, the method comprising:
generating a beam intensity signal and a focusing error signal by illuminating laser beam and moving an objective lens;
acquiring a first time interval for a focus point of the laser beam to move from a first layer to a second layer of the optical disc according to the beam intensity signal or the focusing error signal;
detecting a second time interval between two peak values of an S curve of the focusing error signal; and
calculating the thickness between the first layer and the second layer according to a known S-curve detection range, the first time interval and the second time interval, wherein the S-curve detection range is multiplied by said first time interval and divided by said second time interval to obtain the thickness between the first layer and the second layer of the optical disc.

2. The method according to claim 1 wherein the first layer is a surface layer of the optical disc, and the second layer is a first recording layer of the optical disc.

3. The method according to claim 1 wherein the first layer is a first recording layer of the optical disc, and the second layer is a second recording layer of the optical disc.

4. The method according to claim 1 wherein the optical disc is a multi-layer disc, and the first layer and the second layer are any two recording layers of the multi-layer disc.

5. A device for detecting a thickness of an optical disc, the device comprising:
a processing unit for issuing a focus control output signal;
a motor driver electrically connected to the processing unit for issuing a focus motor output signal according to the focus control output signal;
a focusing actuator electrically connected to the motor driver for generating a driving force according to the focus motor output signal;
an objective lens connected to the focusing actuator and moved in response to the driving force;
a photo sensor for receiving laser beam reflected from an optical disc in response to movement of the objective lens, thereby generating plural photo signals; and a pre-amplifier electrically connected to the photo sensor for receiving the photo signals, synthesizing the photo signals into a beam intensity signal and a focusing error signal, and transmitting the beam intensity signal and the focusing error signal to the processing unit, wherein a first time interval for a focus point of the laser beam to move from a first layer to a second layer of the optical disc is acquired by the processing unit according to the beam intensity signal or the focusing error signal, a second time interval between two peak values of an S curve of the focusing error signal is detected by the processing unit, and the thickness between the first layer and the second layer is calculated according to a known S-curve detection range, the first time interval and the second time interval.

6. The device according to claim 5 wherein the processing unit comprises:

a controlling unit for issuing the focus control output signal;

a time interval measuring unit for receiving the beam intensity signal or the focusing error signal, thereby acquiring the first time interval for the focus point of the laser beam to move from the first layer to the second layer of the optical disc and detecting the second time interval between the two peak values of the S curve of the focusing error signal;

a memory for recording the S-curve detection range; and a thickness calculating unit electrically connected to the memory and the time interval measuring unit for receiving the S-curve detection range, the first time interval and the second time interval, wherein the S-curve detection range is multiplied by said first time interval and divided by said second time interval to obtain the thickness between the first layer and the second layer of the optical disc.

7. The device according to claim 6 wherein the controlling unit further corrects a spherical aberration effect or judges a type of the optical disc according to the thickness between the first layer and the second layer.

8. The device according to claim 5 wherein the first layer is a surface layer of the optical disc, and the second layer is a first recording layer of the optical disc.

9. The device according to claim 5 wherein the first layer is a first recording layer of the optical disc, and the second layer is a second recording layer of the optical disc.

10. The device according to claim 5 wherein the optical disc is a multi-layer disc, and the first layer and the second layer are any two recording layers of the multi-layer disc.

* * * * *